(12) United States Patent
Christopher

(10) Patent No.: US 6,647,814 B2
(45) Date of Patent: Nov. 18, 2003

(54) SELECTIVE DRIVE MECHANISM

(75) Inventor: Hugh Christopher, West Bridgeford (GB)

(73) Assignee: Lear Corporation, Southfield, MI (US)

( * ) Notice: Subject to any disclaimer, the term of this patent is extended or adjusted under 35 U.S.C. 154(b) by 70 days.

(21) Appl. No.: 09/863,717

(22) Filed: May 23, 2001

(65) Prior Publication Data

US 2002/0011126 A1 Jan. 31, 2002

(30) Foreign Application Priority Data

May 31, 2000 (GB) .............................. 0013064

(51) Int. Cl.[7] .............................................. F16H 25/20
(52) U.S. Cl. ................... 74/89.39; 74/411.5; 188/77 W
(58) Field of Search ............................ 74/89.39, 89.38, 74/424.78, 424.77, 411.5, 665 F, 665 G, 665 GD, 665 S, 665 T, 665 K; 188/77 W

(56) References Cited

U.S. PATENT DOCUMENTS

| | | | | |
|---|---|---|---|---|
| 3,654,816 A | * | 4/1972 | Beery et al. | .............. 74/424.75 |
| 3,842,690 A | | 10/1974 | Gulick | |
| 4,425,814 A | * | 1/1984 | Dick | ....................... 192/109 A |
| 4,747,320 A | * | 5/1988 | Nilsson | ...................... 74/411.5 |
| 4,977,788 A | | 12/1990 | Besemann | |
| 5,282,392 A | | 2/1994 | Fan et al. | |
| 5,582,461 A | * | 12/1996 | Pickles | ................... 297/362.14 |
| 5,673,593 A | * | 10/1997 | Lafferty | ....................... 192/141 |
| 5,713,242 A | | 2/1998 | Kanner et al. | |

FOREIGN PATENT DOCUMENTS

EP 0 259 641 3/1988

* cited by examiner

Primary Examiner—William C Joyce
(74) Attorney, Agent, or Firm—Bill C. Panagos

(57) ABSTRACT

A selective drive mechanism comprises a driven drive shaft (2), a drive nut (4), locking means (6) and an operable control arm (10). The drive nut (4) is disposed about the drive shaft (2) and is adapted to be selectively driven by the drive shaft (2). The locking means (6) is associated with the drive nut (4) and drive shaft (2) and comprises a helical coil spring mounted about said drive shaft (2). The operable control arm (10) is arranged to selectively engage with and operate the locking means (6). The mechanism (3) is arranged such that with the control arm (10) in a first position the locking means (6) is arranged to lock the drive nut (4) to the drive shaft (2) so that the relative positions of the drive nut (4) and drive shaft (2) are fixed. With the control arm (10) however in a second position the locking means (6), drive nut (4) and drive shaft (2) are arranged so that the drive nut (4) can move relative to the drive shaft (2). Preferably a number of such drive mechanisms (3) are mounted on a common shaft (2) in order to provide a multiple selective drive mechanism (40).

16 Claims, 2 Drawing Sheets

SELECTIVE DRIVE MECHANISM

CROSS REFERENCE TO RELATED APPLICATIONS

This application claims priority to United Kingdom Application No. GB 0013064.1 filed May 31, 2000.

BACKGROUND OF THE INVENTION

The present invention relates generally to motorised drive or actuation mechanisms and in particular to selectively engagable drive or actuation mechanisms which are particularly suitable for providing multiple selective drive or actuation means. Specifically, although not exclusively, the invention relates to a drive mechanism which is suitable for automotive applications and in particular to providing a multiple selective drive and actuation mechanism for an adjustable seat.

Various motorised drive or actuation means are generally well known. Such means often comprise a motor which rotates shafts, lead screws, gears, worms gears or other transmission means in order to provide motive power to a particular mechanism, or to move a member. There are numerous such arrangements and there is a constant desire to provide improved simplified, robust, reliable and cost effective motorised drive means.

With such motorised drive means it is generally required to be able to selectively operate the drive means. Selective movement of the mechanism or member driven by the motor is typically controlled by controlling and switching the power to the motor. Consequently if multiple motorised drive and actuation means are required, which are independently operable and are to be independently selectable, then separate motors and drive means are generally provided which may be individually controlled. Consequently many motors and separate control means are required. This is costly and generally undesirable.

Within the automotive field and within automotive vehicles there are numerous, and an increasing number of, applications of motorised drive means and multiple, independently selectable drive means.

In particular it is common for vehicle seats to be increasingly adjustable in a number of different ways. For example vehicle seats may be required to slide relative to the vehicle in a forward and rear direction (track), to be raised and lowered (lift), to tilt (tilt), and/or for the seat back to recline (recline). Other adjustments may also be required. Increasingly such seat movements and adjustments are required to be motorised. Conventionally individual motors connected to suitable mechanical transmission and adjustment mechanisms have been used within the seat assembly to provide the required motorised adjustment. Each of the individual motors is controlled by separate switches and control means. The use of multiple motors is costly and is generally undesirable, especially as the number of independent motorised adjustable drives required for a seat, and so motors required, increases. Furthermore as the number of motorised seat adjustments increases it is increasingly difficult to install the increasing number of individual motors conventionally required.

Another automotive application where multiple selectable drive means are required and used is for motorised wing or door mirror adjustment. Again multiple individual motors are generally used. There are also a large, and increasing, number of other applications of multiple selectable motorised drive means within the automotive field. Furthermore there are other similar such applications in other fields.

It is therefore desirable to provide an improved selective drive mechanism which addresses the above described problems and/or which offers improvements generally. In particular it is desirable to provide a simple and effective selective drive mechanism which is cheap and simple to manufacture. It is also desirable to provide a simple multiple drive arrangement which similarly is cheap tp produce and provides multiple drive to a number of adjustment mechanisms.

SUMMARY OF THE INVENTION

According to the present invention there is provided a selective drive mechanism as described in the accompanying claims.

In an embodiment of the invention there is provided a selective drive mechanism comprising a driven drive shaft, a drive nut/drive element disposed about the drive shaft and which is adapted to be selectively driven by the drive shaft, a locking means associated with the drive nut and drive shaft, and an operable control arm which selectively engages with and operates the locking means. The locking means comprising a coil, helical spring coaxially mounted about the drive shaft. The mechanism is arranged such that with the control arm in a first position the locking means is arranged to lock the drive nut to the drive shaft so that the relative positions of the drive nut and drive shaft are fixed. However with the control arm in a second position the locking means drive nut and drive shaft are arranged so that the drive nut can and is moved relative to the drive shaft.

Accordingly the mechanism provides a simple and effective means for providing a selective drive from a driven shaft with the drive only being provided and the mechanism only engaging the driven drive shaft when selected by movement of the control arm. In this arrangement the drive element is also in both modes of operation engaged and located on the driven shaft. As such the drive element/nut is positively located during both modes of operation.

Furthermore such a selectable drive mechanism is particularly suitable and advantageous for use in providing a multiple selective drive mechanism.

In effect the mechanism of the present invention is, and provides, a selective clutch type means to selectively provide and output drive from a drive shaft in response to the clutch (selective drive mechanism, and specifically the control arm) being operatively engaged by an operator.

Preferably there may also be provided in an embodiment a multiple selective drive mechanism comprising at least two operatively selective drive mechanisms of the type described above, in which a common drive shaft comprises the drive shaft of each of said at least two selective drive mechanisms.

With such a mechanism a multiple selective drive can be provided from a single driven shaft. This advantageously means that only one motor is required to drive the common shaft in order to provide a multiple selective drive arrangement and mechanism.

The selective drive mechanism described, and in particular the multiple selective drive mechanism, is particularly advantageous for use within the automotive field and for providing a selective drive means for components of an automotive vehicle. In particular, and for example, it is particularly advantageous for providing a multiple drive means for a vehicle seat. This is because, at least in part, because the mechanism is particularly adaptable, is of a relatively small size, and can easily be integrated into a vehicle. Accordingly it provides a vehicle designer with increased flexibility, in particular when compared to drive mechanisms involving the use of multiple individual motors. As a result the designer can more easily incorporate the drive mechanism into the vehicle and the drive mechanism and user operating controls (control arm) can be conveniently sited in relation to a user or occupant.

In the automotive field cost and reliability are also key specific considerations, possibly even more so than in some other fields. The proposed mechanism addresses both of these concerns, as compared to prior arrangements especially those using multiple individual motors. It will also be appreciated that drive mechanisms for use with vehicle seats have to be able to withstand high loads and in particular high loads generated during impacts. The mechanical selective locking arrangement of the present invention provides an effective possible means for handling such loads. The mechanical locking also does not rely upon the limited strength or robustness of a motor which may be limited or require specification of a larger motor to handle the high maximum impact loads. These and other advantages, as well as the specific peculiar requirements of the automotive field make the invention particularly, although not exclusively, suitable for such use.

DETAILED DESCRIPTION OF THE INVENTION

Figure 1:
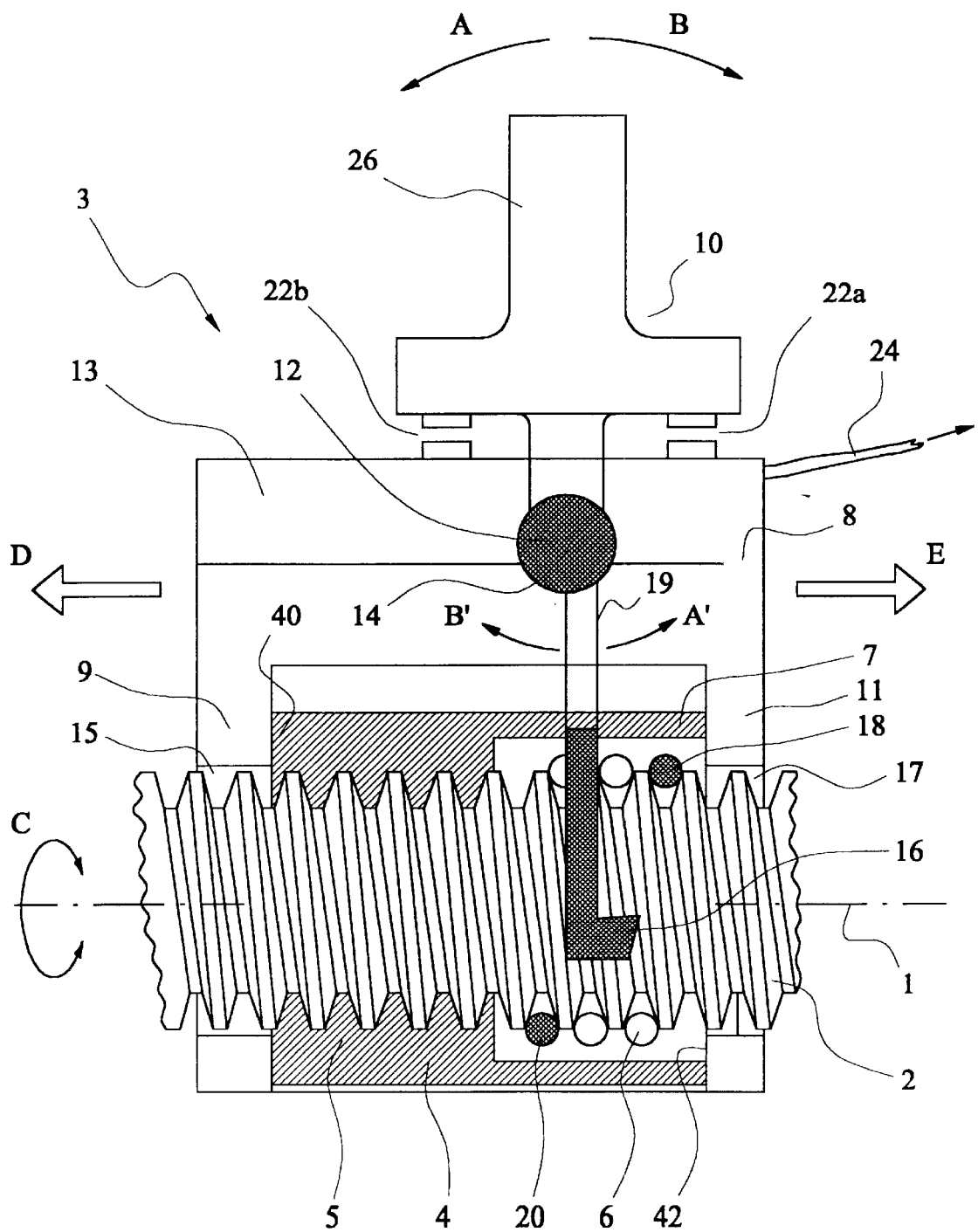
FIG. 1 is a schematic cross sectional view of an embodiment of the selective drive mechanism according to the present invention.

Referring to FIG. 1 an embodiment of a drive mechanism 3 according to the invention comprises a drive shaft 2 in the form of a threaded lead screw having a central axis 1. The drive shaft 2 is drivingly connected to a motor (not shown) which in operation is arranged to rotate the drive shaft 2 about the central axis 1, as shown by arrow C.

A generally cylindrical drive nut 4 is coaxially mounted on the threaded drive shaft 2. The drive nut 4 has an internally threaded bore section 5 at one end which is in engagement with the threads of the treaded drive shaft 2. The remaining axial end section 7 of the drive nut 4, which extends axially from the threaded section 5, is unthreaded and is spaced radially from the threaded drive shaft 2 to define, at least in part, an internal annular chamber between the drive shaft 2 and drive nut 4.

The drive nut 4 is engaged within a drive yoke 8. The drive yoke 8 comprises two flange plate arms 9,11 which are laterally spaced apart and are generally parallel to each other. The flange plate arms 9,11 are interconnected by, and extend from, a main portion 13 of the drive yoke 8 which is disposed on one side of the drive shaft 2. The flange plate arms 9,11 are disposed generally perpendicularly to the axis 1 of the drive nut 4 and drive shaft 2 and each include a central aperture 15,17 through which the drive shaft 2 extends. The flange arms 9,11 abut against respective ends 40,42 of the drive nut 4 so that the drive nut 4 is held axially between, and within, the flange arms 9,11 of the drive yoke 8 and is engaged within the drive yoke 8.

As will be explained later, the drive yoke 8 in operation moves and is driven in an axial direction relative the drive shaft 2 as shown by arrows D and E. The drive yoke 8 is connected, either directly or indirectly to the device to be operated or actuated, with the drive yoke 8 providing the motive output, in the form of linear movement, from the drive mechanism 3. The drive yoke 8 is slidingly held, or keyed, within a housing (not shown) such that rotation of the drive yoke 8 is prevented and the drive yoke 8 can only slide in a linear axial direction D,E.

A locking wrapped spring 6 comprising a helical coil spring is mounted coaxially on the drive shaft 2 radially inside and within the internal annular chamber between the drive shaft 2 and unthreaded section of the drive nut 4. The coils of the spring 6 engage and are resiliently biassed and dimensioned to clamp against the exterior threaded surface of the drive shaft 2. In particular the pitch and size of the coils of the spring 6 are arranged such that the coils fit within, and are urged against the threads of the drive shaft 2. Each end of the coil spring 6 comprises a free arm 18,20. The free arms 18,20 are at opposite ends of the coil spring 6, they are also axially spaced apart along the drive shaft 2 with the coils of the spring 6 disposed between them. These free arm ends 18,20 of the spring 6 extend laterally from the axis 1 of the drive shaft 2, and tangentially to the threaded outer surface of the drive shaft of the drive shaft 2 and coil spring 6. Each free arm end 18,20 extends from opposite respective sides of the drive shaft 2 and coil spring 6. This is shown more clearly in FIG. 2 which shows an end view of the spring 6 as seen along the axis 1 of the drive shaft 2. The free arms 18,20 of the spring 6 extend laterally from the drive shaft 2 through a suitable aperture(s) (not shown) defined within the drive nut 4. The apertures within the drive nut 4 are suitably sized to allow the free arms 18,20 of the spring 6 to move slightly before they contact the periphery of the aperture and the free arms 18,20 of the spring engage an engagement portion of the drive nut 4.

It will be appreciated that the apertures defined in the drive nut 4 allowing the free arms 18,20 to pass through the drive nut 4 and providing a suitable spiring engaging portion within the drive nut 4 can be of many forms. In particular the unthreaded section 7 of the drive nut 4 could comprise two oppositely spaced arcuate sectoral extensions of the threaded drive nut section 5 with the remaining sectors of the generally cylindrical drive nut 4 profile being open. The drive nut 4 would thereby be of a castellated type form.

The biassing of the coil spring 6 is such that the spring 6 is normally securely locked onto the drive shaft 2, and in operation will rotate with rotation of the drive shaft 2. Specifcally the coil spring 6 is biased such that it contract onto and engages the threaded drive shaft 2 due to the relative dimensions of the coil spring and drive shaft 2 and resilience of the coil spring 6. The ends of the free arms 18,20 of the spring 6 which extend through apertures in the drive nut 4 are arranged to engage and abut against the drive nut 4, during in operation rotation of the drive shaft 4 and spring 6. Specifically if the drive shaft 2 is rotated in a first direction then the free arm 18 at one end of the spring 6 will engage the drive nut 4. Similarly if the drive shaft 2 is rotated in a second direction then the free arm 20 at the other end of the spring 6 will engage the drive nut 4. In this way, and since the coil spring 6 to some extent fills the threads of the drive shaft 2, the drive nut 4 is rotationally secured to the drive shaft by the coil spring 6. As a result the drive nut 4 will generally rotate with the rotation of the drive shaft 2. The coil spring 6 in effect thereby provides a locking means to relatively rotationally lock the drive nut 4 to the drive shaft 2 and ensure that the drive nut 4 rotates with the drive shaft 2.

The coil spring 6 provides a particularly advantageous locking means due, in part to its simplicity and its natural bias to engage and lock onto the shaft. In particular a simple drive shaft 2, which is easy to manufacture, can be used when a coil spring 6 is used to provide the locking means. Furthermore a coil spring 6 is particularly suitable to engage a threaded shaft, and lock thereto, due to the complementary nature of the coils of the coil spring 6 and the thread. It will be appreciated that other spring arrangements could however be used to provide the locking means in a similar manner.

A control arm 10 is pivotally mounted to the main portion 13 of the drive yoke 8 about a pivot pin 12 and pivot axis 14 which is perpendicular to the drive shaft axis 1 and is to one side of the drive shaft 2. The control arm 10 and pivotal mounting 12 of the control arm 10 is disposed at an axial position between the axial position of the free arms 18,20 of the spring 6. The pivotal mounting 12 of the control arm 10 is located part way along the length of the control arm 10 and divides the control arm 10 into a spring engaging portion 19 of the control arm 10 and an actuation portion 26 of the control arm 10.

Figure 2:
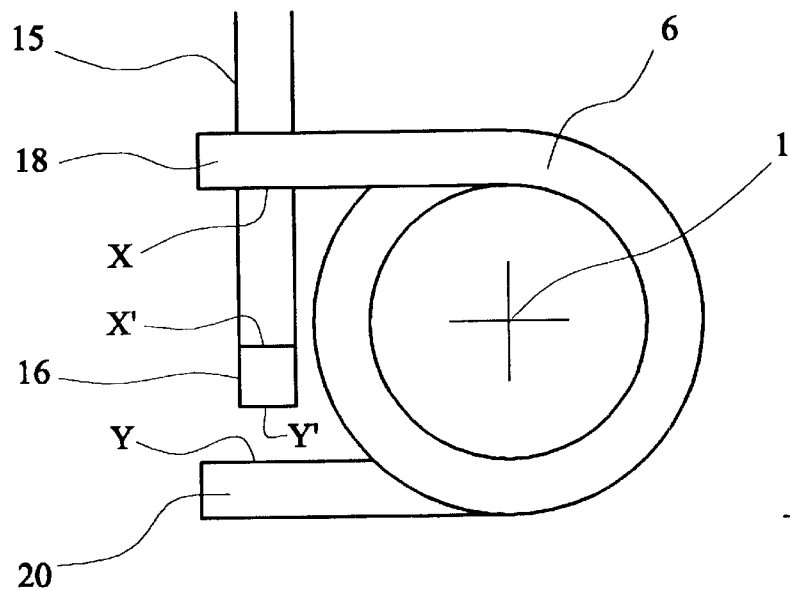
FIG. 2 is detailed end view of the locking spring and control lever of FIG. 1 showing their relationship.

The spring engaging portion 16 of the control arm 10 extends from the pivot mounting 12, on the same lateral side of the drive shaft 2 as the free arms 18,20 of the spring 6, and extends between the free arms 18,20 of the spring 6 as shown in FIGS. 1 and 2. The distil end of the spring engaging portion 19 of the control arm 10 is enlarged to provide a contact member 16 which, in use and as will be explained further, is arranged to engage with the free arms 18,20 of the spring 6.

The second actuation portion 26 is adapted to be operated, either directly or via suitable further linkages, by an operator to pivot the control arm 10 about its pivot axis 14 as shown by arrows A,A' and B,B' and, as will be explained in more detail later, is used to selectively operate the drive mechanism 3.

With the control arm 10 in the normal null position, as shown in FIG. 1 the spring engaging portion 15 of the control arm 10 is clear of and does not engage the free arms 18,20 of the spring 6. The control arm 10 being disposed at a position along the coiled part of the coil spring 6 along the drive shaft between and free of the projecting free arms 18,20 of the coil spring 6. In operation as the drive shaft 2 is rotated, as shown by arrow C, by the motor (not shown) the spring 6 locks the drive nut 4 to the drive shaft 2 and the spring 6 and drive nut 4 will rotate with the drive shaft 2. The drive nut 4 rotates within and relative to the drive yoke 8. There is substantially no relative rotation of the drive shaft 2 and drive nut 4. During rotation of the drive shaft 2 the drive nut 4 will therefore not move axially along the threaded drive shaft 2 and will remain at generally the same axial position on the drive shaft 2. Consequently the drive yoke 8 will remain generally stationary and will not move in a linear axial direction relative to the drive shaft 2.

Actuation and pivoting of the control arm 10 by an operator to an first selected operative position moves the spring engaging potion 15 and contact member 16 of the control arm 10 into engagement with one of the free arms 18,20 of the coil spring 6 at points X,X' or Y,Y'. During rotation of the drive shaft 2, in a direction which urges the free arm 18,20 into contact with the contact member 16 of the control arm 10, the spring 6 will be restricted from rotating with the drive shaft 2 by the engagement of the free arm 18,20 with the control arm 10. As a result the coil spring 6 will unwind, against its natural bias as the drive shaft 2 rotates. As the spring 6 unwinds its internal diameter increase and is enlarged. This will release the spring 6 from locking engagement with the drive shaft 2 thereby rotationally releasing the drive nut 4 from the drive shaft 2 and permitting it to rotate relative to the drive shaft 2. Engagement of the control arm 10 with the spring 6 also holds the drive nut 4 relative to the control arm 10 and drive yoke 8 such that the drive nut 8 no longer rotates within the drive yoke 8. As a result, and due to the resultant relative rotation of the drive nut 4 and drive shaft 2, the drive nut 4 will move linearly along the threads of the drive shaft 2 as the drive shaft 2 rotates. This movement of the drive nut 4 moves the drive yoke 8 in a corresponding linear direction D thereby providing a motive output from the drive mechanism 3 to the device to be operated.

Similarly pivoting and movement of the control arm 10 in an opposite direction to a second operative position moves the spring engaging portion 15 and contact member 16 of the control arm 10 into engagement with other free arm end 20 of the coil spring 6 at points Y,Y'. Rotation of the drive shaft 2 in the opposite direction accordingly urges that free arm 20 into contact and engagement with the control arm 10. The spring 6 will therefore similarly unwind to unlock the drive nut 4 from the shaft 2, lock the drive nut 4 to the drive yoke 8, and cause the drive nut 4 and drive yoke 8 to move linearly in the opposite direction.

It will be appreciated that, in order to ensure engagement of the respective free arm 18,20 of the spring 6 with the control arm 10 as it is moved to each of the respective operative positions, that the drive shaft 2 must rotate in the correct respectively opposite direction. Accordingly contact switches 22a,22b are operatively associated with the control arm 10. The contact switches 22a,22b are connected 24 to the motor and/or motor controller such that activation of one switch 22a activates the motor to rotate in a first direction, whilst activation of the other contact switch 22b activates the motor to rotate in a second direction. Movement of the control arm 10 to the respective first or second operative position activates the respective contact switch 22b to activate the motor to rotate in the required direction.

Movement of the control arm 10 to the null position allows releases the spring 6 from engagement with the control arm 10, allowing the spring 6 to rewind itself onto the drive shaft 2 due to its natural bias, and to lock the spring 6 and drive nut 4 to the drive shaft 2.

Accordingly this mechanism 3 provides a selective drive means and output via the drive yoke 8 to a device to be selectively operated. The movement of the control arm 10 to either the first or second operative position selectively engages and operates the mechanism 3 to provide, via the drive yoke 8 a linear output movement D,E in a respective direction. Movement of the control ram 10 to the null position disengages the drive mechanism 3 and accordingly disengages the drive mechanism 3 and output movement.

Significantly it should be noted that the drive shaft 2 can rotate without causing an output movement from the drive mechanism 3. Rotation of the drive shaft 2 only causes an output movement from the drive mechanism 3 when the control arm 10 is selectively moved to one of the operative positions. The drive mechanism 3 is therefore selectively engagable and provides a selectable drive output.

This feature is particularly advantageous and means that a number of similar such drive mechanisms 3 can be mounted on a common drive shaft 2. Since each of the individual drive mechanisms 3 can be selectively engaged, the individual drive mechanisms 3 can be substantially independently and individually engaged to provide a substantially independent output despite being mounted on a common drive shaft 2. Rotation of the common shaft 3 only causes movement, and a drive output from the drive mechanism 3 that is selectively engaged, with those drive mechanisms 3 on the common shaft 2 which are not selected and selectively engaged remaining stationary. Consequently a common drive shaft 2, driven by a common single motor, can be used with a multiple number of substantially independent drive mechanisms 3 to provide a substantially independent selectable multiple drive output. This can be contrasted with previous arrangements in which, generally, to provide multiple independently selectable drive outputs a number of motors have to be used.

A particular exemplary application including a number of selectable drive mechanisms 3 on a common drive shaft 2, is to provide a multiple selective powered drive mechanism 40 for a multiply adjustable vehicle seat. A multiply adjustable vehicle seat typically includes a number of mechanisms to adjust the various positions of parts of the seat and of the seat relative to the vehicle. In particular the fore and aft position (track) of the seat, the height of the seat (lift), and the tilt angle (tilt) of the seat may all be adjustable. The above described arrangement can be used to provide a selective drive to each of these mechanisms from a single motor.

Figure 3:
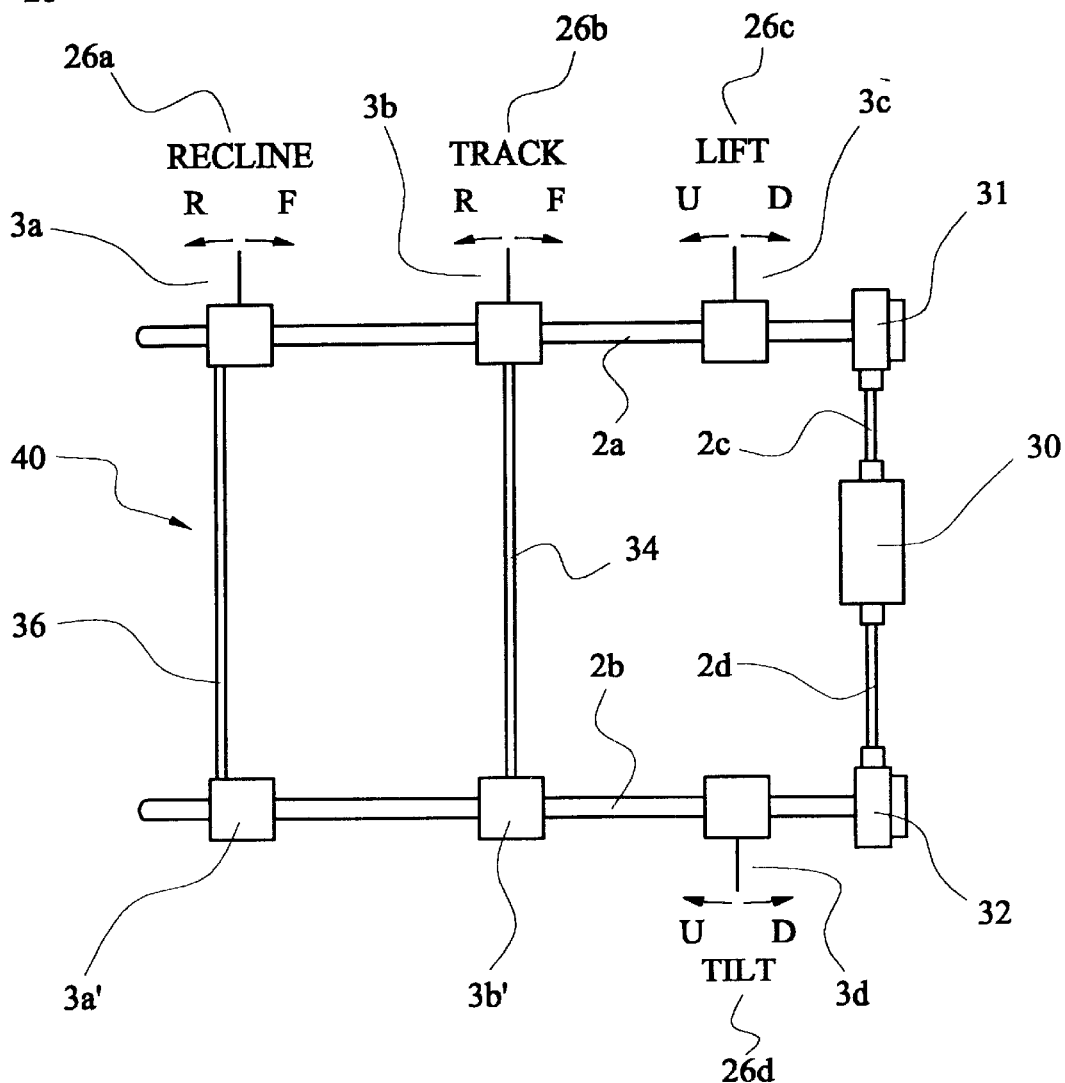
FIG. 3 is a schematic illustration showing an embodiment of the application and arrangement of a number of the selective drive mechanisms shown in FIG. 1 in order to provide an automotive seat adjustment mechanism.

As shown in FIG. 3, for each of the adjustable functions and mechanisms (Recline, Track, Lift and Tilt) of the seat there is provided a separate selective drive mechanism 3a, 3b, 3c, 3d, each similar to those shown and described in FIG. 1. Each of these drive mechanisms 3a, 3b, 3c, 3d is located at a suitable position within the seat and is connected to the respective adjustment mechanism/linkage of the seat. The respective actuation portions 26a, 26b, 26c, 26d of the control arms 10 are located at convenient positions on the seat to the operated by an operator and occupant of the seat. The track 3b, recline 3a and lift 3c drive mechanisms are mounted on a first drive shaft 2a. The tilt 3d drive mechanism is mounted upon a second drive shaft 2b. Also mounted on the second drive shaft 2b are further slave drive mechanisms 3a',3b' for the recline and track functions. These slave drive mechanisms 3a'3b' have their respective control arms connected to the control arms 10 of the main drive mechanisms 3a,3b by sync rods 36,34. The two drive shafts 2a,2b are interconnected and connected to a single drive motor 30 via suitable gearboxes/gear arrangements 31,32 and further flexible drive shafts 2c, 2d. Consequently since the drive shafts 2a, 2b, 2c and 2d are all drivingly interconnected together they can be regarded as a common single drive shaft 2. The use of separate drive shafts 2a,2b and flexible drive shafts 2c, 2d and transmission gears 31,32 however allows the individual drive mechanisms 3a, 3b, 3c, 3d to be positioned within the seat in convenient and suitable positions.

It should be noted that the selective drive mechanisms, and the selection means (i.e. control arm) operated by the user, can be advantageously be located within the seat at the point of use where the drive is needed. This being assisted in particular since a separate bulky motor does not have to be provided for each individual drive required as with prior arrangements. The selective drive mechanisms of the present invention being relatively small and so are easier to accommodate. The location of the selective drive mechanisms and selection means simplifies the overall construction. Furthermore by locating the section means at the point of use on the seat provides an intuitive siting of the selection means.

The contact switches 22a,22b of the individual drive mechanisms 3a, 3b, 3c, 3d are connected to a motor controller and interlock. This is in order to ensure that the motor 30 and drive shafts 2a, 2b, 2c, 2d are activated to rotate in the correct and compatible rotational direction, in particular for the case when more than one of the drive mechanisms 3a, 3b, 3c, 3d is selected by moving the respective control arms 10 into an operative position.

Using this arrangement 40 a single motor 30 can be used to provide powered selective drive to variously adjust the seat position. As well as reducing the number of motors used to provided drive to the various seat adjustment functions, the single motor can be located at a remote location where it can be better sound proofed. Consequently the arrangement 40 is quieter than conventional arrangements employing a number of individual drive motors which are located variously within the seat.

The actuation portions 26 of the mechanism may be operated directly by a user. Alternatively a further linkage mechanism maybe connected to the actuation portion 26 to provide for remote actuation of the mechanism 3. Furthermore a solenoid actuation means could be connected to the actuation potion 26. An electrical switch connected to and activating the solenoid via a suitable control circuit would then control actuation of the mechanism 3.

Each of the individual mechanisms 3a, 3b, 3c, 3d in a multiple system 40 as shown for example in FIG. 2 could accordingly be provided with an individual solenoid actuation means. The individual solenoids could be connected to a common control unit with individual activating switches, also connected to the control unit, arranged to activate the individual respective solenoids and mechanisms 3a, 3b, 3c, 3d.

Electronic memory units are increasingly being incorporated with adjustable vehicle seats. Such units store a particular set of seat adjustment positions. The electronic memory units are used to recall the recorded adjustment position and automatically adjust the seat to that recorded position. Such electronic memory units and their use are generally known in the art. Conventionally such systems include a number of sensors to monitor and record the rotation of the various individual drive motors used to drive the various adjustments of the seat.

An electronic memory unit can be incorporated within the above described seat adjustment mechanism 40. In such a case the electronic memory unit includes a single rotary sensor on the single drive motor. A signal from each of the activating switches for actuation of the individual drive mechanisms 3a, 3b, 3c, 3d is supplied to the electronic memory unit. Accordingly in order to record a particular adjustment position the electronic memory unit, in operation, records which switches are activated and the rotation/rotational position of the single drive motor. To adjust the seat to the required recorded position the memory unit simply activates the recorded operation of the switches and activates the motor to carry out the recorded number of rotations. It will be recognised that this arrangement, using the multiple drive mechanism of the invention is particularly advantageous since, because only one drive motor is used, only one rotary sensor is required and also only one set of control relays within the electronic memory unit are required to control the drive of the motor. This significantly simplifies the system and reduces the cost since the rotary sensor and power control relays for the motor are relatively expensive and complex.

It will be appreciated that there are a number of other potential applications of the selective drive mechanism 3 to provide selective drive to other adjustable components within a automotive vehicle. For example a similar arrangement could be use to provide drive to the mirror adjustment mechanism in a vehicle. Furthermore there are many other potential applications of the drive mechanism 3 in other fields.

In an alternative, although generally similar, embodiment of the selective drive mechanism 3 according to the invention the threaded drive shaft 2 could be replaced with a smooth shaft. The drive nut is similarly unthreaded although still mounted coaxially on the shaft. The locking spring still selectively locks the drive nut rotationally to the drive shaft. The drive yoke in this embodiment however is fixed. The exterior profile of the drive nut is of a gear form and provides a geared output from the drive mechanism. In this way the output from this embodiment of the drive mechanism is provided directly by selective rotation of the drive nut. In operation movement of the control arm selectively locks and unlocks the drive nut to the drive shaft to thereby selectively engage the drive nut rotationally with the drive shaft and cause rotation of the drive nut.

In the second embodiment the rotational movement provided by the drive shaft is selectively transmitted by the drive mechanism, and specifically by the drive nut in the form of a rotational output movement. On the other hand in the first described embodiment the rotational the rotational movement provided by the drive shaft is selectively transmitted by the drive mechanism, and specifically by the drive nut in the form of a linear and in particular an axial output movement. It will therefore be appreciated that the selective drive mechanism in accordance with the present invention can be suitably arranged and configured to provide a rotational and/or linear output motion.

It will also be appreciated that although the invention has been described in relation to a driven drive shaft which rotates about an axis 1, in other embodiments the drive shaft may be driven in a reciprocating linear manner along its axis 1. In this case the drive mechanise would still selectively be engaged with the drive shaft to transmit this driven motion.

In view of the above described embodiments and a true appreciation of the invention in its broadest form, it should also be understood that the drive nut is not limited to simply a threaded member on a shaft. The term drive nut, as used to describe the broadest aspects of the invention, has a broad meaning and covers any type of suitable drive element located upon a shaft or spindle. The terms therefore specifically covers a sprocket, disc, or gear mounted upon a shaft. Notwithstanding this the use of a drive nut with a threaded form as described in the first embodiment is particularly advantageous.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A selective drive mechanism comprising:
    a driven shaft mounted for rotation;
    a drive element disposed about the drive shaft;
    the drive element adapted to be selectively driven by the drive shaft;
    a locking arrangement associated with the drive element and drive shaft, said locking arrangement comprising a coil spring coaxially mounted about the drive shaft, wherein said coil spring selectively engages with the drive shaft to rotationally lock the drive element to the drive shaft; and
    an operable control arm which selectively engages with and operates the locking arrangement;
    a drive yoke which is engaged with the drive element to transmit the movement of the drive element, wherein the control arm is pivotably mounted on the drive yoke;
    the mechanism arranged such that with the control arm in a first position the locking arrangement is arranged to lock the drive element to the drive shaft so that the relative positions of the drive element and drive shaft are substantially fixed, whilst with the control arm in a second position the locking arrangement drive element and drive shaft are arranged so that the drive element is moved in use relative to and by the movement of the driven drive shaft.

2. A selective drive mechanism as claimed in claim 1 in which a free end of the said coil spring 6 comprises free arm which projects from said drive shaft upon which the coil spring is mounted, the control arm arranged to selectively engage said free arm to, in use, unwind said coil spring.

3. A selective drive mechanism as claimed in claim 1 in which the drive shaft is rotatable and in the first position is arranged to rotate the drive element.

4. A selective drive mechanism as claimed in claim 3 in which at least a portion of the drive shaft is threaded and comprises a lead screw upon which the drive element which has a cooperating thread is mounted and engaged.

5. A selective drive mechanism as claimed in claim 4 in which the drive element comprises a drive nut.

6. A selective drive mechanism as claimed in claim 1 in which an exterior profile of the drive element comprises a gear form.

7. A selective drive mechanism as claimed in claim 1 in which, in use, the drive mechanism converts rotary motion of the drive shaft into a linear output motion.

8. A selective drive mechanism as claimed in claim 7 in which the output motion comprises relative linear movement of the drive element in the direction of the axis of the drive shaft.

9. A selective drive mechanism as claimed in claim 1 in which, in use, the drive mechanism is adapted to provide a rotary output motion.

10. A multiple selective drive mechanism comprising at least two operatively selective drive mechanisms as claimed in claim 1 in which a common drive shaft comprises the drive shaft of each of said at least two selective drive mechanisms.

11. A multiple selective drive mechanism as claimed in claim 10 in which the common drive shaft comprises a single drive shaft.

12. A multiple selective drive mechanism as claimed in claim 10 in which a single motor is connected to the common drive shaft.

13. A drive mechanism as claimed in claim 1 for use in an automotive vehicle.

14. A drive mechanism as claimed in claim 13 for providing selective drive for the movement of at least one part of an adjustable automotive vehicle seat.

15. A method of providing a selective drive output motion using a drive mechanism according to claim 1.

16. A selective drive mechanism as claimed in claim 1 in which the coil spring is engageable to surround the drive shaft to rotationally lock the drive element to the drive shaft, and is engageable to unwrap from the drive shaft to selectively disengage the drive element from the drive shaft.

* * * * *